INVENTORS
Richard E. Ryder, Jr.
Richard E. Ryder

INVENTORS
Richard E. Ryder, Jr.
Richard E. Ryder

INVENTORS
Richard E. Ryder, Jr.
Richard E. Ryder

INVENTORS
Richard E. Ryder, Jr.
Richard E. Ryder

BY

ATTORNEYS

United States Patent Office 3,283,362
Patented Nov. 8, 1966

3,283,362
APPARATUS FOR PROCESSING MATERIALS
Richard E. Ryder, Jr., 901 Pinecrest Lane, Richardson, Tex., and Richard E. Ryder, 6670 Yosemite Lane, Dallas, Tex.
Filed Feb. 4, 1966, Ser. No. 525,243
7 Claims. (Cl. 18—1)

This invention relates to an apparatus for material reduction, consolidation, and mixing and relates more particularly to an apparatus for processing fibrous and powdered materials into a mixture of fibrous pellets impregnated with the powdered materials in a continuous phase of the powdered materials.

It is one object of the invention to provide an apparatus for reducing, consolidating, and mixing fibrous and powdered materials.

It is a particularly important object of the invention to provide an apparatus for processing fibrous and powdered materials into a mixture including a substantial number of pellets comprising both the fibrous and powdered materials.

It is another particularly important object of the invention to provide an apparatus for shredding fibrous materials, mixing them with the powdered materials, and forming from such mixture pellets having a fibrous core coated with the powdered materials.

It is another object of the invention to provide an apparatus for producing pellets from a mixture of fibrous and powdered materials by subjecting the mixture to the combined action of cutting by relatively movable cutting edges and rolling between substantially parallel planar surfaces moving relative to each other.

It is another object of the invention to provide an apparatus for producing a useful insulating cement building product by shredding, fluffing, and sizing masses of fibrous material mixing such masses with powdered materials, further shredding and mixing the fibrous masses and powdered materials while simultaneously reducing the fibrous masses and impregnating them to form pellets having a substantially fibrous, somewhat impregnated core, coated by the powdered materials by subjecting the mixture to relatively moving planar and knife edge surfaces until the pellets are of the desired density.

It is a still further object of the invention to provide an apparatus for mixing and pelletizing fibrous and powdered materials including means for shredding, fluffing, and forming the fibrous materials into graded masses, means for mixing the fibrous masses with the powdered materials, means for introducing the mixture into a drum, rotatable drum means including meshing, radially extending drum and relatively movable rotor vanes having planar faces of substantially greater width than their edge surfaces, means for removing the mixture of materials from the drum, and means for packaging the mixture into desired quantities.

It is another object of the invention to provide a mixing and pelletizing apparatus including a cylindrical drum having a plurality of circumferentially spaced rows of axially aligned, radially inwardly projecting, drum vanes and an axially extending rotor including a plurality of circumferentially spaced rows of axially aligned, radially extending, rotor vanes intermeshing with the drum vanes, the relationship of the drum and rotor vanes being such that only one row each of drum and rotor vanes mesh during any one time period and the drum vanes are baffled along outer end sections providing a lifting and dumping surface or shelf for introducing the material being processed into the drum and rotor vanes.

It is still a further object of the invention to provide a mixing and pelletizing apparatus having a drum and rotor each provided with circumferentially spaced rows of axially aligned radial vanes adapted to mesh upon relative motion of the rotor and drum wherein only one row of rotor vanes meshes with a row of drum vanes during a given time period and each row of rotor vanes has about 25% as many vanes as each row of drum vanes thereby minimizing the power input requirements of the mixing and pelletizing apparatus for rotating the rotor relative to the drum.

It is a still further object of the invention to provide a mixing and pelletizing apparatus including a drum having three rows of evenly circumferentially spaced, axially aligned, radial vanes around a movable rotor having four rows of evenly circumferentially spaced, axially aligned, radial vanes, each of the rows of rotor vanes including about one-fourth as many vanes as included in each row of the drum vanes and each drum and rotor vane having opposite planar side faces in its planes of movement, such faces being substantially wider than the thickness of the vane measured axially.

Additional objects and advantages of the invention will be readily apparent from the reading of the following description of a device constructed in accordance with the invention, and reference to the accompanying drawings thereof, wherein.

Figure 1:
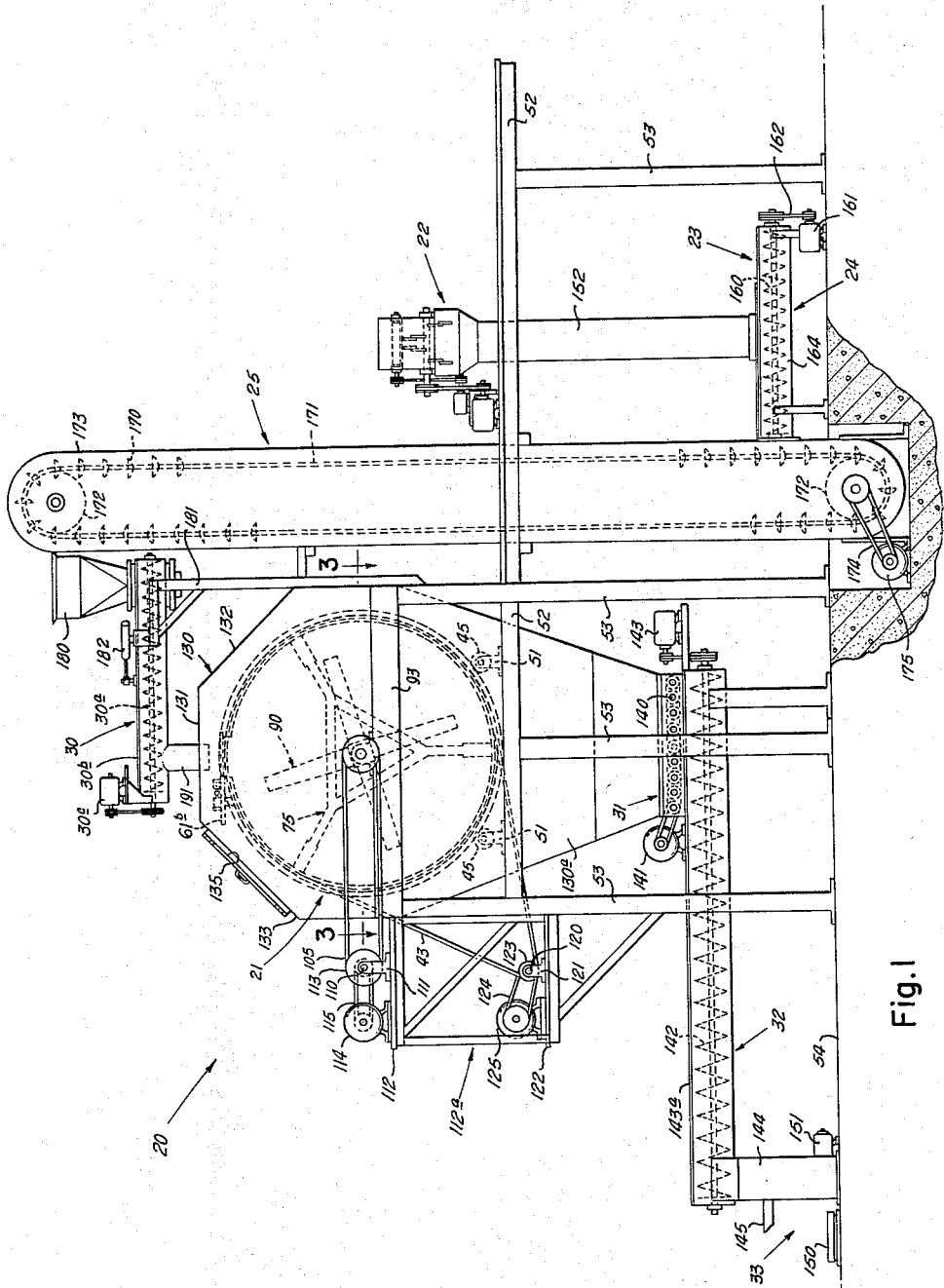
FIGURE 1 is a side view in elevation of one form of material processing system embodying the invention.

Referring to the drawings, a material processing system 20 embodying the invention includes a drum type mixing and pelletizing unit 21 which is fed raw materials from both a hammermill 22 and a loading station at 23 through a first screw conveyor 24, a bucket elevator 25, and second screw conveyor 30. The system 20 also includes a screw conveyor unit 31 and a screw conveyor 32 for receiving and handling a mixed and pelletized product from the drum unit 21.

Fibrous materials are introduced into the system through the hammermill 22 which forms them into masses of a desired size and discharges them into the screw conveyor 24 while powdered materials are introduced at 23 into the screw conveyor 24. The fibrous and powdered materials are conducted by the screw conveyor 24 into the elevator 25 which lifts them and discharges them into the screw conveyor 30. The fibrous material and powdered materials pass into the unit 21 where the fibrous masses are reduced in size into pellets, impregnated with powdered material, and mixed with short fibers and the remaining powdered materials. The processed materials are then discharged from the drum unit into the screw conveyor 31 which conducts them into the screw conveyor 32 through which the materials are moved to a packaging or bagging unit 33.

The mixing and pelletizing drum unit 21 has a cylindrical drum 34 having opposite ends 35 and side wall structure 40 which is thickened along its opposite end sections 41, each of which is provided with a pair of external annular grooves 42 to receive belts 43 for rotating the drum. Two external, annular, channel shaped tracks 44 are suitably secured in axial spaced relation around the side wall of the drum near its end sections for movably supporting and guiding the drum on four trunnion wheels 45. Two trunnion wheels are received in each track 44 spaced from each other on opposite sides of the longitudinal axis of the drum. The two trunnion wheels on one side of the longitudinal axis of the drum are secured in one shaft 50 while the other two trunnion wheels on the other side of the axis are on another shaft 50. The two shafts 50 extend parallel to the longitudinal axis a sufficient distance to cradle the drum on the trunnion wheels so that it will remain rotatably supported by its tracks and the trunnion wheels throughout the speed ranges in which the durm is operated in processing the materials. The opposite ends of the shafts 50 are supported in suitable bearings or pillow blocks 51 having ball or sleeve-type bearings, not shown. The pillow blocks are secured on parallel, horizontally extending, floor members 52 supported on vertical posts 53 extending from a floor 54.

The drum 34 is loaded and unloaded through a pair of longitudinally spaced rectangular openings 55 which are each covered and uncovered by a power-operated door 60. Each of the openings 55 is framed by a flange member 61 having a rim 61a whose side sections are received in a return bend 62 along each side edge of a door 60 so that the door is slidable in a direction perpendicular to the longitudinal axis and a radius line of the drum to cover and uncover its opening 55. The doors are simultaneously opened or closed by a motor 63 connected through a suitable gear unit 64 to a longitudinally extending shaft 65 which is rotatably supported by suitable pillow block bearings 70 mounted on the drum side wall on opposite sides of each of the openings. The shaft 65 carries pinion bearings 71 which mesh with rack bars 72 secured on the top surface and near each side edge of each of the doors 60. Each of the flange members around each of the openings has side edge extensions 61b, illustrated diagrammatically by broken lines in FIGURE 1, to permit each of the doors to slide to the positions shown in FIGURE 3 so that the openings 55 are fully uncovered for either loading or unloading. The doors 60 thus move in a straight line parallel to a tangent line to a circular cross section of the drum.

The inside of the drum 34 along its side wall 40 is baffled or contoured to facilitate optimum distribution of the material processed in the drum. Each of the end sections of the drum is fitted with a frusto-conical wall section member 73 whose large base end is secured around the inside surface of the drum wall while its reduced head end is secured to the inside surface of the end plate 35. A V-shaped internal annular central baffle 74 is secured within the drum transverse to its longitduinal axis and substantially midway between the end plates 35 with the bight portion 74a of the baffle extending inwardly of its leg edges 74b which are suitably secured, as by welding, to the inside of the wall of the drum. The baffles 73 and 74 guide the materials which may move along the inside wall of the drum toward its ends back into the paths of the drum and rotor vanes.

The drum 34 is internally fitted from end to end with a plurality of spaced, parallel, transversely positioned vane units 75, each of which comprises three radially extending, circumferentially spaced, vanes 80 having outward fixed ends 80a suitably secured, as by welding, along the inside wall of the drum and inward free ends 80b interconnected by braces 81. The drum vanes 80 are shorter in length than a radius line between the longitudinal axis of the drum and its inner wall surface to provide a longitudinal unobstructed space within the free ends of the drum vanes to receive the shaft and hub components of the rotor, as described below. All of the vane units 75 are aligned perpendicular to the longitudinal axis of the drum at the same angle or position within the drum to provide three longitudinally extending rows of drum vanes 80 circumferentially spaced 120 degrees apart within the drum. Each row of drum vanes 80 is partially baffled along outer end sections 80c of the vanes by two longitudinal baffle plates 82 which extend along the side edges of all of the drum vanes 80 in each row of vanes and are connected at opposite ends into the frusto-conical wall members 73. Spacer members 83 are fitted between the plate 82 for evenly spacing the vanes along the length of the drum and the baffles, to aid in interconnecting the baffles and the drum vanes, and keep the materials processed in the drum from between adjacent baffles. The baffles 82 provide lifting or distribution shelves within the drum so that as the drum is rotated part of the material being processed therein is lifted upwardly by each baffle 82 as it moves circumferentially upwardly with drum rotation until it is at an angle above the horizontal at which the material falls off the shelf toward the axis of the drum into the relatively moving rotor and drum vanes.

Figure 4:
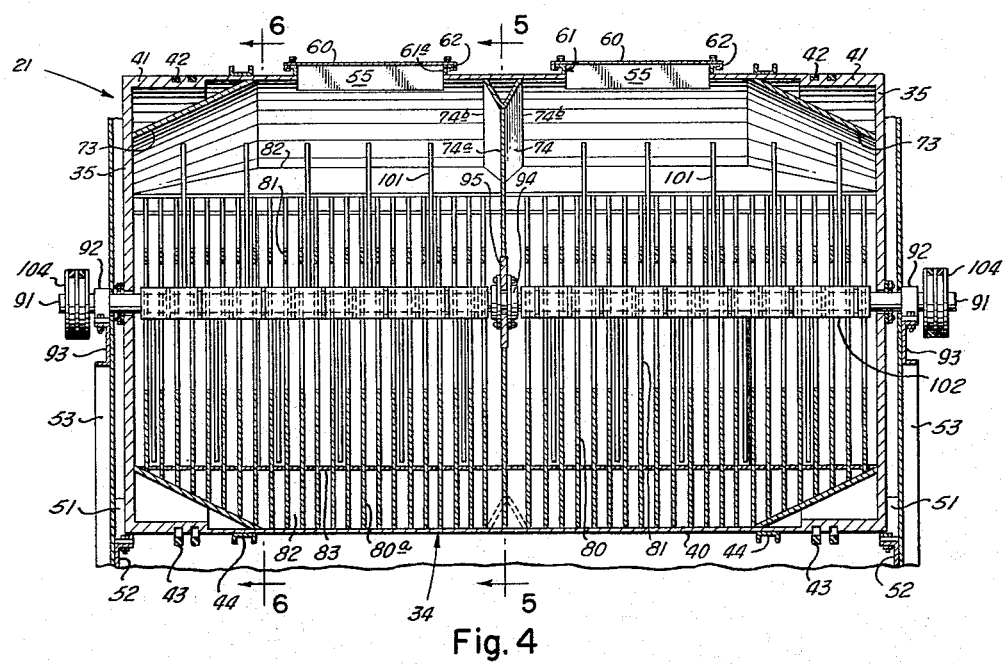
FIGURE 4 is a longitudinal view in section taken along the line 4—4 of FIGURE 3.
Figure 5:
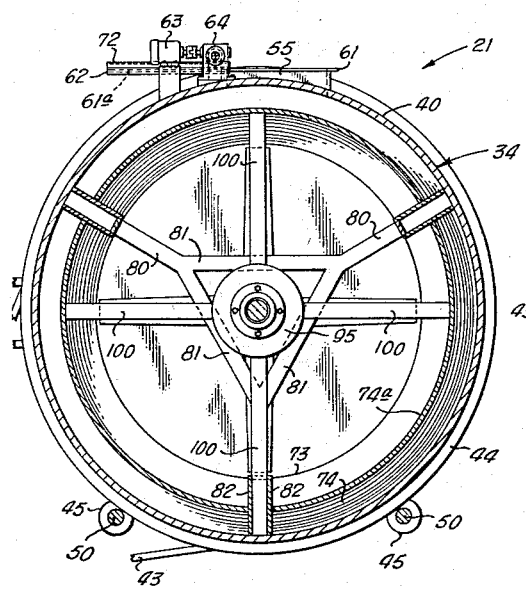
FIGURE 5 is a view partially in section and partially in elevation along the line 5—5 of FIGURE 4.

A rotor 90 is rotatably supported within the drum on a shaft 91 which extends through the drum coincident with its longitudinal axis between pillow block type bearing units 92 each of which is supported on a horizontal frame member 93 secured on the top ends of the posts 53. The shaft 91 is centrally supported within the drum on a bearing 94 secured through a plate 95, as illustrated in FIGURES 4 and 5, suspended transverse to the longitudinal axis of the drum on a spider formed by four radial legs 100 circumferentially spaced at 90° intervals around the plate and connected at their outer ends to the bight portion 74a of the V-shaped annular baffle 74. The bladed components of the rotor comprise two half-sections secured on the shaft 91 on opposite sides of the bearing 94 extending to the opposite ends 35 of the drum, as best seen in FIGURE 4. Each section of the vaned portion of the rotor is identical in construction and includes a plurality of cantilever vanes having parallel faces in their planes of rotation and side edges tapered toward their free ends. The vanes are suitably secured, as by welding, at their inward ends to a square hub 102 held on the shaft 91 by a plurality of set screws 103 so that the hub and its vanes rotate with the shaft. The vanes 101 are spaced longitudinally and circumferentially in what may be considered a spiral pattern around the hub 102. For example, in FIGURE 8, a vane 101a is on a first side of the hub, a vane 101b is on a second side of the hub spaced along the hub from the vane 101a, a vane 101c is on a third side of the hub spaced along the hub from the vane 101b and a vane 101d is on a fourth side of the hub spaced along the hub from the vane 101c. This sequence is repeated along the full length of each section of the rotor. The spiral patterns of the rotor vanes for the right and left end section of the rotor are opposite so that rotor rotation in one direction feeds the material being processed toward the center of the drum and rotor while rotor rotation in the opposite direction feeds the material outwardly toward the opposite ends of the drum and rotor. Such rotor-vane arrangement provides a balanced load which minimizes the thrust bearing requirements. Each rotor vane is centered between adjacent drum vanes. There are four longitudinal rows of rotor vanes 101 spaced ninety (90) degrees apart around the hub. The distribution of the blades around the hub and their longitudinal spacing provides one rotor vane aligned with each fourth space between drum vanes as a row of rotor vanes meshes with a row of drum vanes.

The drum vanes 80, their free end connecting members 81, and the rotor vanes 101 are all of substantial width relative to their thickness, width being measured along a line transverse to the length of each of the vanes while thickness is considered along a line parallel to the longitudinal axis of the drum and rotor along the axis of the shaft 91. The edge surfaces of the drum and rotor vanes adjoin the opposite faces of the vanes at substantially ninety degree angles at which they are finished with sharp edges to enhance the shredding ability of the vanes. The substantial planar side surface areas of the vanes provide rolling surfaces between adjacent drum and rotor vanes as they mesh for reduction and impregnation of the fibrous masses into pellets. The spacing between the planar surfaces of the rotor vanes and the planar surfaces of the adjacent drum vanes when a row of rotor blades is intermeshed with a row of drum blades determines the maximum pellet size of material processed in the drum unit. The rotor vanes are tapered along their edges toward their free ends thereby gradually reducing the widths of the planar side faces of the vanes toward their free ends to reduce radially outwardly the loads on the vanes due to the friction with the material rolled by the vanes and minimize the probability of their being broken due to overloading. The rotor vanes are each as near as practicable the length of the distance between the hub 102 and the inside longitudinal edges 82a of the baffles 82a to provide maximum rolling surface between the vanes. In a particular preferred embodiment of the invention drum vanes three-eighths of an inch thick are placed on one and one-quarter inch centers while each rotor vane is substantially centered between adjacent drum vanes and is about three-eighths of an inch thick. Thus, the preferred spacing between the adjacent planar surfaces of the counter-rotating drum and rotor vanes is approximately one-fourth of an inch.

The two sections of the hub 102 of the rotor 90 are each held on the shaft 101 by the set screws 103 each of which suitably engages the shaft to hold the hub and its vanes against rotation relative to the shaft so that they may be turned by the shaft. A sheave 104 is secured on each end section of the shaft 91 outward of the pillow block 92 to receive belts 105 which transmit force for rotating the rotor from a horizontal shaft 110. The shaft 110 is rotatably mounted through a plurality of bearing units 111 supported on a top deck 112 of a platform 112a secured to two of the posts 53. The belts 105 extend between the sheaves 104 and sheaves 113 on the shaft 110. The shaft 110 is driven by a motor 114 connected by belts 115 to a sheave 119 on the shaft 110.

In fabrication of the mixing and pelletizing unit, the rotor is first assembled and secured within the drum. The drum vanes, their baffles, and interconnecting components are then secured within the drum around the rotor.

The belts 43, which rotate the drum 34 on its trunnion wheels 45, are driven from a horizontal shaft 120 mounted between pillow block bearing units 121 on a lower deck plate 122 of the platform 112a. The belts 43 are received on sheaves 123 on the shaft 120 which is driven by belts 124 extending from a motor 125.

The drum unit 21 is enclosed within a housing 130 having a top surface 131 adjoining downwardly and outwardly sloping angular side surfaces 132 and 133. The top surface 131 of the housing has an arcuate opening 134, shown in FIGURE 2, for loading the materials into the drum from the screw conveyor 30. For loading, the drum is rotated to a position at which its doors 60 are opened and the openings 55 are below the arcuate opening 134 in the housing. The front angular face 133 is provided with openings 135 covered by hinged doors 136 which are opened for inspection and service purposes permitting full access into the drums through its openings 55 when the drum is rotated to align the opening 55 with the housing opening and the doors 60 are retracted. The multiple unit screw conveyor 31 is secured to the bottom of a lower hopper section 130a of the housing 130 to receive discharged processed material from the drum when it is rotated with its opening 55 downward.

The multiple screw conveyor 31 is a conventional unit having a plurality of parallel adjacent screw elements 140 which are simultaneously rotated by suitable interconnecting means such as gears, a chain drive, or a belt drive, connected with a motor 141. The screw conveyor elements are rotated by the motor to continuously move material through the hopper section of the housing 130 to the screw conveyor unit 32 which also is a conventional form of unit having a screw element 142 driven by a belt connected motor 143. The conveyor 31 discharges at one end into the conveyor 32. The processed material is transported through the conveyor 32 into a suitable bagging or packaging unit 33 which receives the material in a housing 144 and discharges it through either of two chutes 145 into a suitable container, such as a bag, not shown, resting on one of the platforms 150. The packaging unit 33 is driven by motor 151.

The hammermill 22 is a commercially available unit which receives fibrous materials such as rock wool and asbestos, shreds and forms it into fluffy ball-like masses which are discharged from the hammermill into a vertical chute 152 through which the fibrous masses fall into the conveyor 24. The hammermill discharges through a screen which permits the passage of fibrous masses below a predetermined size, which, in one preferred embodiment, are about an inch in diameter. The hammermill includes a rotor having a plurality of hammer-like pivoted elements which contact the fibrous material, shred it, roll it, and fluff it as they throw the material against a plate adjacent to the rotor in forming the fibrous material into the fluffy ball-like masses. One example of a hammermill which has performed satisfactorily in one embodiment of the invention is a 15-inch Model No. 94HM-M15–A, Catalog No. 87–2975, manufactured by Montgomery Ward and Co., Chicago, Illinois.

The screw conveyor 24 discharges into the bucket elevator 25 which includes a plurality of pivotally supported buckets 170 mounted on a continuous belt or chain 171 operating between end pulley units 172 within a housing 173. The lower pulley unit is driven by a belt 174 connected with a motor 175. The bucket elevator is conventional in design and its function is suitably served by any apparatus which moves the mixture of powdered and fibrous materials from the lower level at the conveyor 24 to the upper level for charging the drum unit through the screw conveyor 30.

The bucket elevator 25 discharges into a hopper 180 which directs the materials into one end of the screw conveyor unit 30 which includes a screw unit 30a driven in a housing 30b by a motor 30c. The conveyor 30 is pivotally mounted for horizontal movement from support members 181 extending upwardly from two of the posts 53. The free end of the conveyor 30 is movable above the drum unit through an arc generally defined by the arcuate opening 134 in the top of the housing 130. Movement of the screw conveyor between its two end loading positions is effected by a hydraulic ram 182 pivotally supported on one end by the members 181 and connected with the conveyor between its free and pivoted ends. A vertical discharge chute 191 is connected into the housing 30c near its free end at a position at which the discharge chute is received within the arcuate opening 134 in the drum housing 130.

Figure 6:
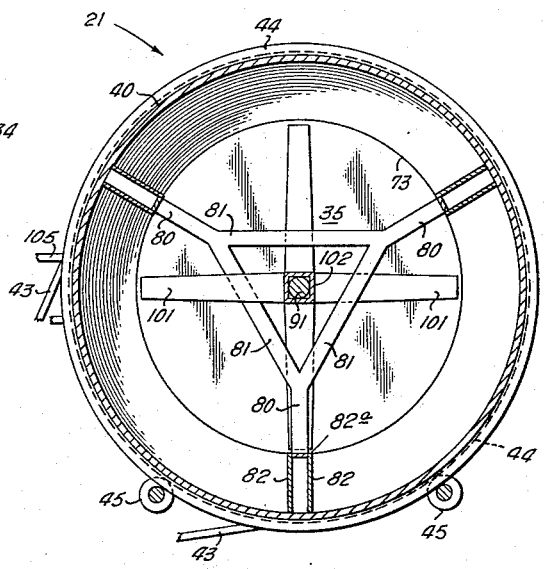
FIGURE 6 is a view partially in section and partially in elevation along the line 6—6 of FIGURE 4.

Screw conveyors of the types of the units 24, 30, and 32 are conventional, such as illustrated by the unit 86 in FIGURE 6 of United States Patent No. 2,219,285, issued to F. E. Allen et al., October 29, 1940.

The system 20 is particularly suited to the manufacture of an insulating cement product which is mixed with water and molded around such apparatus as steam pipes where it sets to provide a heat insulation covering over the pipes. One such insulating cement comprises a mixture of fibrous and powdered materials with a portion of the materials being formed into pellets having a fibrous core partially impregnated by the powdered materials and having an outer covering of the various powdered materials.

The fibrous materials may include mineral wool and asbestos and the powdered materials may be hydraulic cement such as Portland cement, clays such as bentonite, limestone, and other fillers and bonding agents.

The first step in the process of the invention is shredding and forming of ball-like masses or very loosely formed pellets of the fibrous materials in the hammermill 22. The fibrous materials, including the mineral wools and asbestos, are placed on the conveyor belt 154, either by hand or by use of suitable automated mechanical equipment, not shown. The conveyor belt is moved by the motor 155 feeding the fibrous materials into the hammermill 22 where they are repeatedly contacted by the revolving hammer elements which shred, roll, fluff, and somewhat shape the fibers into relatively large pellets or ball-like masses which, during the process, impinge on a baffle plate, not shown, deflecting them back into the revolving hammer element. The fibrous masses are discharged on a screen adapted to pass all of the masses below a certain size, which may, for example, be all of those masses having a diameter of less than one inch. A substantial portion of the asbestos remains as loose shredded fibers not intermixed with the mineral wool masses discharged from the hammermill. Both the fibrous masses and loose fibers pass downwardly in the chute 152 into the screw conveyor unit 24.

The powdered materials, such as the cement, clays, etc., are introduced into the screw conveyor 24 through the opening 163 in the housing. The materials are dumped either manually or by automated mechanical equipment through the opening into contact with the screw element. The powdered materials are fed along with the fibrous materials by the screw conveyor into the elevator 25 where they are deposited in the buckets 170 which are raised by the belt or chain 171. The material in the buckets is lifted by the elevator and discharged into the hopper 180 which guides the material into the screw conveyor 30.

Figure 2:
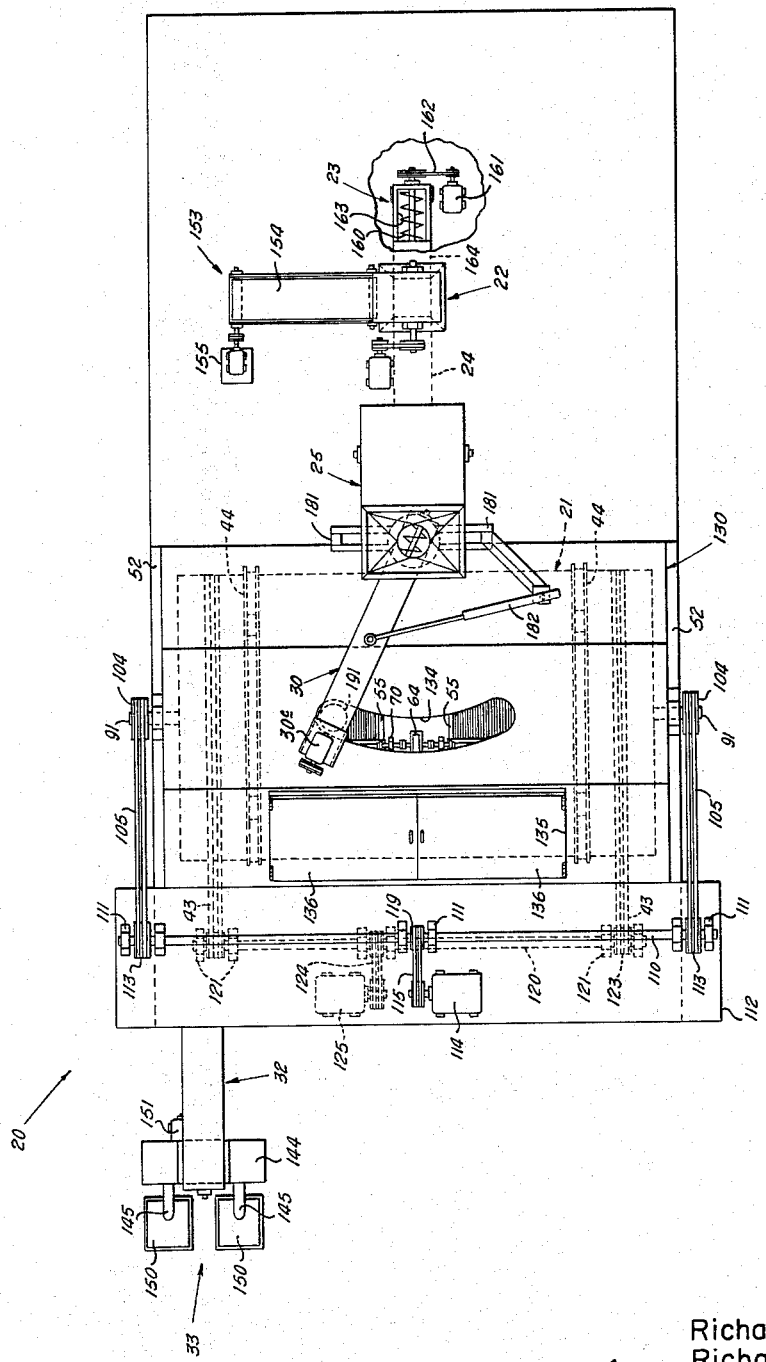
FIGURE 2 is a top plan view in elevation of the system illustrated in FIGURE 1.
Figure 3:
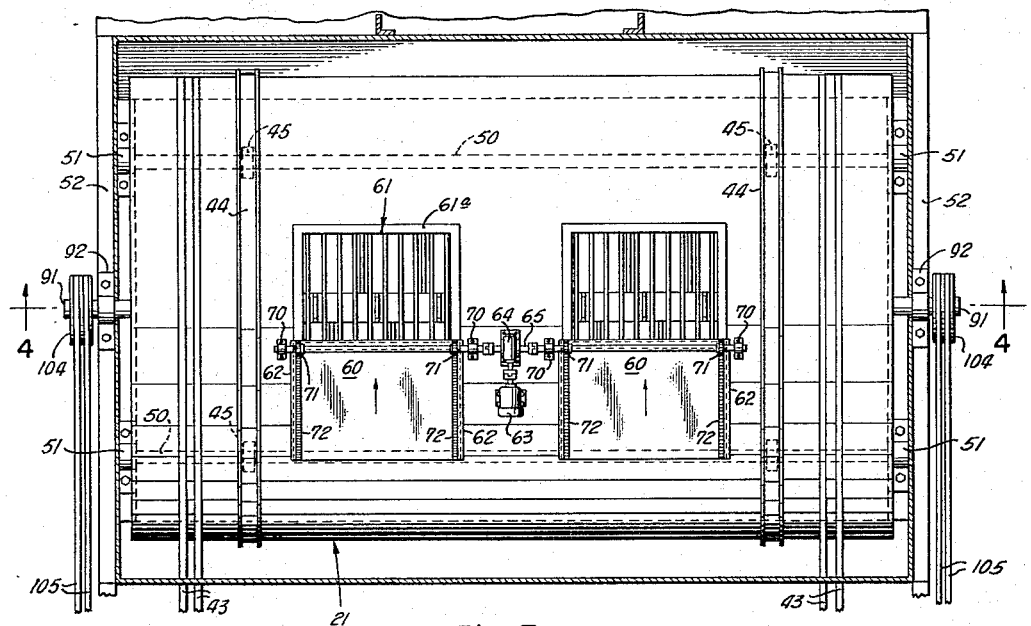
FIGURE 3 is an enlarged, cut-away, fragmentary top view partially in section and partially in elevation illustrating the mixing and pelletizing unit of the system of FIGURE 1.

Preparatory to the feeding of the materials by the elevator into the screw conveyor 30, the drum unit 21 is rotated to a position at which its openings 55 are upright, as illustrated in FIGURES 1 and 2, and the doors 60 are retracted from over the openings by rotation of the shaft 65 with the motor 63. FIGURES 2 and 3 show the drum unit at the loading position with its doors retracted so that the fibrous and powdered materials may be loaded into the drum. The screw conveyor 30 is positioned by its hydraulic ram 182 at one of its end positions relative to the arcuate opening 134 so that the discharge chute 191 is aligned with an opening 55 into the drum. The flow of raw materials, as previously described, is initiated into the hopper 180 from which the materials fall into the screw element 30a rotated by the motor 30c propelling the raw materials toward the free end of the housing 30b for discharge from the housing through the loading chute 191 into the drum through an opening 55. The materials are so deposited in the drum until about half of a drum load has been introduced into the drum through one of its openings 55. The screw conveyor 30 is then shifted by the ram 182 to its other end position at which it is aligned with the other opening 55 into the drum. The fibrous masses and powdered materials are again fed into the hopper 180 and through the conveyor 30 into the other half of the drum. When both halves of the drum have been filled with the desired quantity of the materials the doors 60 over the openings 55 into the drum are moved to their closed position.

With the drum unit 21 charged with the fibrous and powdered materials as described above, the drum is rotated in one direction by the motor 125 at a speed generally in the range of about five to ten revolutions per minute. The rotor unit 90, which is rotatable independently of the drum, is turned in a opposite direction by the belts 105 which are driven from the motor 114. The rotor is counter-rotated relative to the drum at a speed which preferably ranges from about 45 to 50 revolutions per minute. The rotor is preferably turned in a direction which effects movement of the materials in each section of the drum toward each other and toward the center of the drum. It is to be understood, however, that rotation of the rotor in the other direction will feed the materials toward the opposite ends of the drum.

Figure 8:
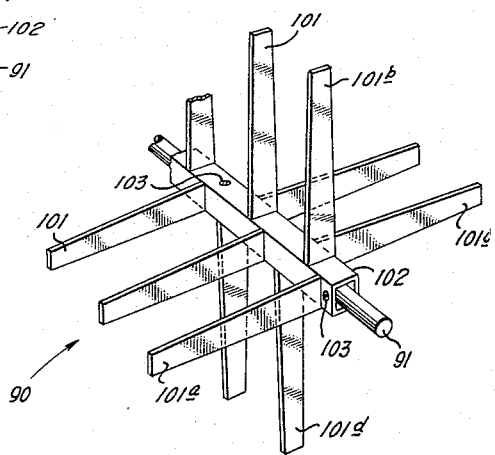
FIGURE 8 is a fragmentary view in perspective showing a portion of the rotor of the pelletizing and mixing unit.

In the particular embodiment of the rotor 90 illustrated in FIGURE 8, this preferred rotation of the rotor is counterclockwise as viewed in FIGURE 8 so that the raw materials are sequentially contacted by the rotor blades 101a through 101d effecting longitudinal movement of the fibrous and powdered material along the rotor and drum as they are tossed, shredded, and pelletized. The other end section of the rotor has its blades so arranged that they spiral toward the center of the support bearing 94 of the rotor shaft so that the rotation in the counterclockwise direction as viewed in FIGURE 8 will result in the material in that section of the drum also being moved toward the center of the drum as the material is processed. Thus, considering both FIGURES 6 and 8, with the rotor rotating in a counterclockwise direction the drum is rotated in a clockwise direction so that the left baffle shelf plates 82 on each of the rows of the drum vanes 80 collect and lift a quantity of the materials upwardly as the shelf is raised by the rotation of the drum. After each of the baffle plates approaches and passes a horizontal position, the load of material being lifted by the plate begins falling from the plate into the paths of the counter-rotating oncoming vanes of the rotor. The material falls through the spaces between the drum vanes while being contacted by the counter-rotating rotor vanes. Generally, as each baffle plate moves through the range of about 45 to 60 degrees above the horizontal position, all of the material carried by the plate is spilled into the counter-moving drum and rotor vanes.

When the materials are initially introduced into the drum unit they comprise the relatively large, fluffy, ball-like masses of fibrous material which may include both mineral wool and asbestos and a quantity of powdered or granulated fine materials as desired for the particular end product being prepared. Thus, in the initial stages of the processing of the materials in the drum unit each quantity lifted by the baffles 82 and spilled into the counter-rotating drum and rotor vanes includes the separate masses of fibrous material and the fine powdered materials. As these materials are dumped into the counter-rotating vanes they are trapped between and rolled by the adjacent planar faces of the rotor drum vanes.

Therefore, the materials are dumped from the shelves 82 into the gaps between relatively moving planar vane surfaces causing the materials to be shredded, rolled, and mixed with the fibrous masses being progressively reduced in diameter while the powdered materials are introduced into the fibrous masses resulting in some impregnation of the fibrous masses and ultimately coating them with the powdered materials. As the counter-rotating drum rotor vanes mesh to produce the cutting and rolling action from counter-moving corner edges of the vanes and the planar surfaces passing each other, only one-fourth of the rotor vanes are meshing with and passing through a row of the drum vanes during one given time period. Since each side of the hub of the rotor has a row of vanes so spaced apart that each rotor vane in a particular row enters every fourth space between the drum vanes and only one row of rotor vanes meshes with the drum vanes at a time, it is necessary that each quantity of the material being processed pass through a number of vane meshing stages to insure that it is thoroughly processed.

The material being processed is continuously subjected to the counter-rotating movement of the drum and rotor vanes as described above with the masses of fibrous material being continuously reduced in size and further impregnated with the powdered materials in the drum until the desired pellet size has been obtained. With the above example of drum and rotor vane spacing and thickness, generally the maximum size pellet within a quantity of the material being processed, after it has been subjected to enough rotations of the rotor and the drum that each of the masses of the fibrous material has passed several times through adjacent counter-moving vanes, the largest pellet is generally no greater than one-fourth inch in diameter. It has been found that the size of the pellets produced by the counter-moving surfaces of the drum and rotor vanes bears a direct relationship to the time of processing in the drum unit. While the maximum size pellet produced is determined by the spacing between the counter-moving planar surfaces of the drum and rotor vanes, further processing of a charge of material in the drum beyond the time when the pellets reach the one-fourth inch size results in their being further compacted to a smaller diameter. It is believed that such result is brought about by the rolling of the pellets against each other and between the planar surfaces so that while some pellets at a given time may be in contact with a planar surface of either a rotor or a drum vane others of the pellets will be rolling against each other so that an extended time of processing in the drum produces pellets of a size appreciably less than the spacing between the planar surfaces of the rotor and drum vanes. During the treating process in the drum unit, some additional shredding of the fibrous materials is believed to occur, while, however, the major action effected in the drum unit is the progressive size reduction and impregnation of the fibrous masses formed in the hammermill and introduced into the drum unit. A minor number of new fibrous masses are created, reduced, and impregnated in the mixing and pelletizing unit though generally the number pellets in a completely processed charge of material varies to only a very minor degree from the number of fibrous masses fed into the unit. The unit weight of a particular mass of the fibrous material is not appreciably increased other than through the addition of the impregnating powdered materials nor are appreciable additional masses of the fibrous materials believed to be formed within the drum unit with longer than normal processing time. Largely, in the preferred process, the rolling action effects size reduction of the fibrous masses along with their impregnation and a consequent increasing of their density as they are reduced in size from substantially one inch in diameter to a range of one-quarter of an inch down less than one-eighth of an inch in diameter.

When the processing of the material in the drum is completed, which may be done during a time period of counter-rotation of the drum and rotor from a minimum of about twelve minutes, the processed, mixed, pelletized and impregnated material is removed from the drum. The drum unit is rotated until its openings 55 are at its bottom or approximately 180 degrees removed from the position shown in FIGURE 1. The doors 60 are then retracted from over the openings 55 to permit the processed product to be spilled from the drum downwardly through the hopper section 130a of the housing 130 around the drum unit into the screw conveyor 31. The drum may be rocked or revolved in opposite directions quickly through a few degrees of rotation if necessary to shake the product from within the drum. The drum is then rocked until the processed material is thoroughly cleared from within it through the hopper section 130a into the screw conveyor 32 which is operated by the motor 141 to propel the material by the multiple screw elements 140 to an end where the material is discharged into the screw conveyor 32. The screw element 142 is rotated by the motor 143 to convey the material along its tubular housing 142a to the packaging unit 144 where the material is discharged through the chutes 145 into sacks or other suitable containers resting on the platforms 150. While a charge of the material is being removed from the hopper section of the drum unit housing, an additional charge may be prepared as previously described and loaded into the drum for processing. The drum is then operated while the charge of product previously deposited into the hopper section of the drum housing is being removed and packaged.

The final processed product removed from the drum unit comprises the pellets which generally are somewhat egg shaped mixed in a continuous phase or body of the finely powdered materials along with loosely mixed unconsolidated short lengths of the fibrous materials, which is predominately asbestos if the fibrous materials comprise both mineral wool and asbestos. Asbestos does not consolidate into the pellets as readily as the mineral wool. The pellets generally are approximately the same in number in a given quantity of the processed material as the number of fibrous masses discharged from the hammermill in preparing the charge for the drum unit. The pellets generally are uniformly sized with the size ranging from a maximum diameter about equal to the distance between the counter-moving planar surfaces of adjacent rotor and drum vanes downwardly to only a fraction of such distance, depending upon the running time of the drum unit in processing the change of material. In other words, while the minimum size pellet producible in the unit is appreciably smaller than its maximum size, all of the pellets in each processed charge of material is generally uniformly sized dependent directly upon the time of processing in the drum unit. Each of the pellets has a central fibrous core impregnated to a minor extent by the powdered materials and having an outer shell or coating largely of the powdered material components of the charge placed in the drum.

While certain specific forms of equipment are described and illustrated for forming the ball-like masses of fibrous materials, conducting the fibrous powdered materials to and loading them into the drum unit, and removing and packaging the final product, it will be recognized that other suitable equipment and equipment organization may be included in the system of the invention. Specifically, the steps of forming the fibrous masses, mixing them with the powdered materials, and introducing the mixture into the mixing and pelletizing unit 21 may be accomplished at the level of the top of the drum unit, either eliminating or altering the required conveyors for moving the materials to and into the drum unit. Also, such steps may be carried out by hand. Similarly, the drum unit may be unloaded through the hopper section 130a directly into large containers on vehicles such as trucks for transport to a packaging station or a point of use.

While counter-rotation of the drum and rotor is preferred so that the material being processed is dumped into oncoming rotor blades, the relative movement required between the planar surfaces of the vanes may be achieved by rotating the drum and rotor in the same directions with the rotor being turned faster than the drum.

Figure 9:
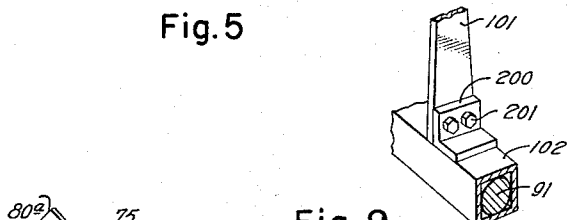
FIGURE 9 is a fragmentary view in perspective illustrating an alternate connection between each rotor vane and the rotor hub.
Figure 7:
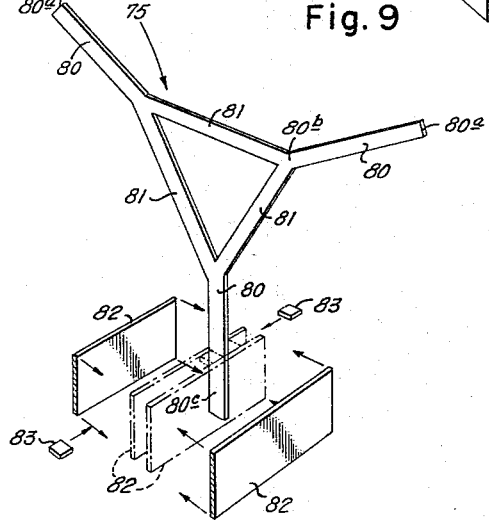
FIGURE 7 is a fragmentary exploded view in perspective showing one set of radial drum vanes and a fragment of the internal, longitudinal drum baffles supported along each row of the drum vanes.

FIGURE 9 illustrates an alternative connection between the rotor hub 102 and each of its vanes 101. A lug or cleat 200 is secured, as by welding, to the hub. The fixed end of the vane is then connected by bolts 201 to the cleat.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. Material processing apparatus for processing a combination of fibrous and powdered materials to produce a product including a plurality of pellets of said fibrous materials impregnated and coated by said powdered materials and comprising: a drum rotatable about its longitudinal axis; a plurality of longitudinally spaced drum vanes extending inwardly from the inside wall of said drum; a longitudinal rotor rotatably positioned within said drum, said rotor having a shaft extending substantially along the longitudinal axis of said drum encompassed by said drum vanes, said rotor including a plurality of radial rotor vanes around said shaft, said rotor vanes being longitudinally spaced along said rotor and aligned between adjacent drum vanes whereby said rotor and drum vanes mesh upon relative rotation of said rotor and said drum; said drum and rotor vanes having planar side surfaces substantially parallel to and spaced apart from each other and substantially greater in width than the thickness of said vanes measured along said longitudinal axis, whereby the adjacent planar surfaces of the sets of vanes provide means for rolling the materials in the drum into pellets, less than all of said rotor vanes meshing with said drum vanes simultaneously; said drum being provided with opening means for feeding materials into and discharging said materials from said drum.

2. Apparatus as defined in claim 1 wherein said drum and rotor vanes are aligned radially in circumferentially spaced longitudinal rows, said rows of rotor vanes and drum vanes are unequal in number and each row of said rotor vanes includes fewer rotor vanes than the number of drum vanes included in each row of drum vanes.

3. Apparatus as defined in claim 1 wherein said rotor vanes are spaced both longitudinally and radially providing said vanes in oppositely arranged spiral configurations along each half-section of said rotor whereby rotation of said rotor in one direction feeds material axially along said rotor toward the center thereof and rotation in the opposite direction feeds said material axially toward opposite ends of said rotor.

4. Mixing and pelletizing apparatus as defined in claim 1 wherein said drum and rotor vanes are aligned in circumferentially spaced longitudinal rows, each of said rows of said drum vanes has a longitudinal baffle extending along opposite edges over outer end sections of said vanes adjacent to the inside wall of said drum, and each of said rotor blades is shorter than the distance between said rotor shaft and a longitudinal inside edge of each of said baffles only sufficiently to provide clearance for rotation of said rotor relative to said drum.

5. A mixing and pelletizing apparatus for processing a combination of fibrous and powdered materials to produce a product including a plurality of pellets of said fibrous materials impregnated and coated by said powdered materials; a cylindrical drum having its longitudinal axis oriented substantially horizontally and rotatable about said axis, said drum being provided with side wall opening means for feeding materials into said drum and for discharging materials from said drum; door means for covering and uncovering said opening means; means supporting said drum for rotation about said longitudinal axis; means for rotating said drum; a frusto-conical baffle secured within each end section of said drum, the large base end of said baffle being secured around the inside wall of said drum and the reduced head end of said baffle being secured to the inside surface of the adjacent end of said drum; a centrally positioned internal annular V-shaped baffle secured along its annular leg edge surfaces to the inside wall of said drum, said baffle being oriented substantially perpendicular to the longitudinal axis of said drum; a plurality of longitudinal rows of drum vanes extending radially inwardly from the inside wall of said drum and said frusto-conical baffles, said rows of drum vanes being circumferentially spaced substantially evenly around said drum, said drum vanes in each of said rows being correspondingly axially spaced along said drum and having a length less than the inside radius of said drum providing a longitudinally extending space throughout the length of said drum within the inward ends of said drum vanes, said inward ends of correspondingly positioned drum vanes in said rows being interconnected with each other by braces circumscribing said space within said free ends of said drum vanes; a longitudinally extending baffle secured along its longitudinal outside edge within said drum between said frusto-conical baffles over each edge of said drum vanes along an outer end section of each drum vane providing a shelf for lifting materials being processed within said drum when said drum is rotated; a rotor rotatably positioned within said drum including a shaft extending through said space within said inward ends of said drum vanes; a plurality of longitudinally spaced radially extending rotor vanes secured along said rotor shaft, said rotor vanes being longitudinally spaced along said shaft whereby each of said rotor vanes is aligned with a space between a pair of adjacent drum vanes in each row of drum vanes; said rotor vanes being radially aligned in different directions around said shaft forming a spiral configuration oriented in one direction along one half-section of said shaft and in the other direction along the other half-section of said shaft; each of said rotor vanes having a length less than the distance between said rotor shaft and the inside longitudinal edges of said longitudinal baffles on said drum vanes only sufficiently to provide clearance for rotation of said rotor relative to said drum; said drum vanes and said rotor vanes having side planar surfaces in their planes of rotation of substantial width relative to the thickness of said vanes along the longitudinal axis of said rotor and said drum thereby providing relatively movable adjacent planar surfaces for rolling and impregnating said pellets; said drum vanes and said rotor vanes being unequal in number and circumferentially spaced whereby only a portion of said rotor vanes meshes at a given time with one row of said drum vanes upon relative rotation of said drum and said rotor; and means secured with said rotor shaft for rotating said shaft relative to and independently of said drum at a speed of at least ten times the speed of rotation of said drum.

6. Apparatus as defined in claim 5 wherein less than all of said rotor vanes mesh with said drum vanes simultaneously.

7. Mixing and pelletizing apparatus as defined in claim 5 wherein said drum includes three rows of drum vanes circumferentially spaced substantially 120 degrees apart, said rotor includes four rows of rotor vanes circumferentially spaced substantially 90 degrees apart, and each row of said rotor vanes has less than 25 percent of the number of vanes included in each row of drum vanes.

References Cited by the Examiner

UNITED STATES PATENTS

| | | | |
|---|---|---|---|
| 621,203 | 3/1899 | Ballbach | 259—109 |
| 908,164 | 12/1908 | Sprague | 259—85 X |
| 1,941,808 | 1/1934 | McConnaughay. | |
| 1,980,130 | 11/1934 | Fasting | 18—1 |
| 2,213,056 | 8/1940 | Skoog et al. | 18—1 X |
| 2,288,087 | 6/1942 | Hanson et al. | 18—1 X |
| 2,728,940 | 1/1956 | Yesberger et al. | 18—1 |
| 2,746,729 | 5/1956 | Eakins | 259—8 X |
| 2,774,577 | 12/1956 | Anderson et al. | |
| 2,926,079 | 2/1960 | Smith | 18—1 X |
| 3,013,866 | 12/1961 | Samoniego et al. | 259—8 X |
| 3,049,750 | 8/1962 | Austin | 18—1 |

J. SPENCER OVERHOLSER, *Primary Examiner.*

J. HOWARD FLINT, Jr., *Examiner.*